United States Patent Office 3,097,183
Patented July 9, 1963

3,097,183
COATING COMPOSITIONS OF EPOXY NOVOLAC RESINS, AMINO RESINS AND ACID ESTERS OF DIETHYLENE GLYCOL AND DIBASIC CARBOXYLIC ACIDS
Richard B. Drubel and Francis J. Buege, Midland, Mich., assignors to The Dow Chemical Company, Midland, Mich., a corporation of Delaware
No Drawing. Filed Oct. 24, 1960, Ser. No. 64,306
9 Claims. (Cl. 260—44)

This invention concerns new coating compositions comprised of epoxy novolac resins, amino resins and acid esters of diethylee glycol and certain dibasic carboxylic acids. It relates more particularly to liquid solutions of mixtures of said resins and acid esters in organic solvents, which solutions are suitable for use as coatings and capable of drying to continuous films which are curable upon heating at elevated temperatures to produce insoluble tough adherent coatings for metals. The invention also pertains to the cured coatings and to methods of making both the liquid coating compositions and the cured coatings.

The liquid coating compositions of the invention are prepared by blending together an epoxy novolac resin having the general formula:

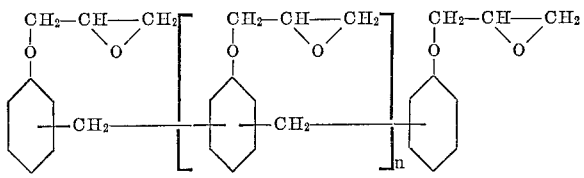

wherein $n$ is an average number from 1 to 1.5, an amino resin such as a urea- or melamine-formaldehyde resin, and alcohol modified derivatives thereof and an acid ester consisting of the reaction product of one gram molecular proportion of diethylene glycol with two gram molecular proportions of maleic anhydride and phthalic anhydride in proportions as hereinafter specified and dissolved in a suitable organic solvent or a mixture of two or more organic solvents.

The epoxy novolac resin starting material can be prepared by reaction of epichlorohydrin and a liquid phenol-formaldehyde condensation product having an average of from three to three and one-half phenol nuclei in the condensation product molecule, in the presence of an alkali metal hydroxide and in amount corresponding to about one gram molecular proportion of the epichlorohydrin per phenolic hydroxyl group in the phenol-formaldehyde condensation product. The epoxy novolac resins are known products and are available commercially.

The amino resins to be employed can be the urea-formaldehyde and melamine-formaldehyde resins, and, alcohol modified derivatives thereof, i.e. alkylated amino resins wherein the alkyl radical contains from 1 to 8 carbon atoms, which amino resins are soluble in organic solvents such as alcohols, ketones, aromatic hydrocarbons, ether alcohols or esters of ether alcohols, e.g. methyl alcohol, ethyl alcohol, n-propyl alcohol, isopropyl alcohol, n-butyl alcohol, sec-butyl alcohol, isobutyl alcohol, acetone, methyl ethyl ketone, methyl isopropyl ketone, methyl isobutyl ketone, benzene, toluene, xylene, monomethyl ether of ethylene glycol, monoethyl ether of ethylene glycol, and acetic acid ester of monoethyl ether of ethylene glycol, or mixtures of any two or more of such organic solvents.

The acid ester of diethylene glycol can be the acidic esters resulting from the reaction of one gram molecular proportion of diethylene glycol and approximately two gram molecular proportions of maleic anhydride or a mixture of at least 20 mole percent of maleic anhydride and not more than 80 mole percent of phthalic anhydride. The acid esters are readily prepared by reacting the diethylene glycol with the maleic anhydride or a mixture of the maleic and phthalic anhydrides by heating a mixture of the reactants in the desired proportions at temperatures between about 80° and 120° C., preferably at from 95° to 105° C., at atmospheric or substantially atmospheric pressure, and in admixture with an aromatic hydrocarbon solvent such as toluene, xylene or ethylbenzene in amount sufficient to permit of the reaction mixture readily being stirred, suitably in amount such as to form a mixture containing the acid esters in a concentration of from about 50 to 80 percent by weight of the mixture.

In preparing the liquid coating compositions, the epoxy novolac resin, the amino resin and the acid esters of diethylene glycol are blended or mixed together, preferably as a solution of said individual ingredients in one or a mixture of two or more organic solvents of the kind hereinbefore mentioned and in a concentration of from 50 to 80 percent by weight, in proportions corresponding to from 28 to 51 percent by weight of the epoxy novolac resin, from 15 to 44 percent by weight of the amino resin and from 22 to 53 percent by weight of the acid ester of diethylene glycol, based on 100 parts by weight of the sum of said ingredients. The composition can be thinned by addition of one or a mixture of organic solvents to produce a coating composition suitable for use by spraying, flow coating, dipping or other conventional means to surfaces of metals, as desired.

Additives such as pigments, dyes, stabilizers, antioxidants, plasticizers and the like can be incorporated with the liquid compositions, but are not required in the invention, although flexibilizing agents such as diglycidil ethers of ethylene glycol, propylene glycol and polyglycols are advantageously incorporated with the compositions in amounts corresponding to from 1 to 10 parts per 100 parts by weight of the ingredients to produce cured coatings having improved flexibility and impact strength.

The liquid coating compositions are suitable for making baked enamel coatings possessing good hardness and adhesion to metals, high resistance to staining and to organic solvents and to aqueous acid and alkali solutions, and which cured coatings possess high impact strength and resistance to cracking, spotting and scratching.

The cured coatings are prepared by applying a layer of the liquid composition to a surface of an article to be coated, e.g. a metal panel or structure such as a refrigerator body, by any usual means such as spraying, flow coating or dipping, to form a film suitably of from one to ten mils thick and thereafter heating the layer at temperatures up to 350° F., preferably between about 290° and 320° F., for a period of from about 15 to 60 minutes, sufficient to dry and cure the same to an insoluble infusible coating. Two or more layers of the liquid composition can be applied to the surface to be coated, e.g. by spraying, until a desired thickness of the coating is obtained, then heating the coating to convert the same to the insoluble infusible state.

The following examples illustrate ways in which the principle of the invention has been applied, but are not to be construed as limiting its scope.

EXAMPLE 1

(A) A charge of 106 grams (1 mole) of diethylene glycol and 88 grams of a mixture of equal parts by weight of xylene and methyl ethyl ketone were placed in a glass reaction vessel equipped with a reflux condenser and stirrer. The mixture was stirred and 98 grams (1 mole) of maleic anhydride and 148 grams (1 mole) of phthalic anhydride were added. The resulting mixture was stirred and heated at 100° C. for a period of one hour. The product was a mixed diester of maleic and phthalic acids and the diethylene glycol, having an acid number of approximately 315 and in a concentration of about 80 percent by weight of the diester and about 20 percent by weight of the mixed xylene and methyl ethyl ketone solvent.

(B) A charge of 40 parts by weight (50 parts by weight of the solution) of the mixed diesters of diethylene glycol and maleic and phthalic acids prepared in part A above, was mixed with 40 parts by weight of Dow Epoxy Novolac Resin 438 (D.E.N. 438) in admixture with 13.3 grams of Cellosolve acetate (acetic acid ester of monoethyl ether of ethylene glycol) and 20 parts by weight of a urea-formaldehyde resin dissolved in 13.3 grams of a mixture of xylene and butyl alcohol. The liquid composition was coated onto one side of bonderite phosphatized No. 26 gauge steel panels of the dimensions 4 x 12 inches. The coating was baked in an oven at 300° F. for a period of 30 minutes to cure the coating. The baked coating was one mil thick and had good flexibility and adhesion and possessed high impact strength.

EXAMPLE 2

A charge of 40 grams of the mixed diester of maleic and phthalic acids and the diethylene glycol prepared in part A of Example 1 was mixed with 40 grams of Dow Epoxy Novolac Resin D.E.N. 438 and 20 grams of a melamine-formaldehyde resin (Resimene 882, Monsanto Chemicals Company). The mixture was diluted to 60 percent by weight of solids with a solvent consisting of equal parts by weight of xylene and Cellosolve acetate. The resulting solution was coated onto 4 x 12 inch steel panels, to form a dry coating thickness of one mil. The coated panels were baked in an oven at 300° F. for a period of 30 minutes. The baked coating had a hardness of 5H (lead pencil test), and good flexibility and adhesion. The coating had an impact value of 24 inch-pounds as determined for a forward impact test, and an impact value of 4 inch-pounds as determined for a reverse impact test. The coating was resistant to the effects of glacial acetic acid, 50 percent aqueous nitric acid solution, 10 percent aqueous sodium hydroxide solution, and methyl ethyl ketone. No failure of the coating was observed after immersion in water at 90° F. for a period of 10 weeks.

EXAMPLE 3

(A) In each of a series of experiments, a diester of diethylene glycol and maleic anhydride, phthalic anhydride, or a mixture of maleic anhydride and phthalic anhydride, as stated in the following table was prepared by heating a mixture of one gram molecular proportion of the diethylene glycol and a total of two gram molecular proportions of the acid anhydride or a mixture of the anhydrides at a temperature of 100° C. for a period of 30 minutes.

(B) In each of a series of experiments, a coating composition was prepared by mixing 40 parts by weight of one of the diesters of diethylene glycol prepared in part A above with 40 parts of Dow Epoxy Novolac Resin D.E.N. 438 and 20 parts of a urea-formaldehyde resin, employing procedure similar to that employed in Example 1. The compositions were coated onto test panels to form a coating one mil thick when baked in an oven at 300° F. The baked coatings were tested for resistance to the action of methyl ethyl ketone by immersing the test panel in said ketone at room tempearture for a period of four days, then removing the test panel, drying and observing the coating. Table I identifies the experiments and gives the molar proportions of the maleic anhydride, phthalic anhydride or mixture of said anhydrides, and the diethylene glycol employed in making the diester used in preparing the coating compositions. The table also gives the observed resistance of the baked coating to methyl ethyl ketone.

Table I

| Run No. | Diester ingredient | | | Composition—Resistance of baked coating to methyl ethyl ketone |
|---|---|---|---|---|
| | Maleic anhydride, moles | Phthalic anhydride, moles | Diethylene glycol, moles | |
| 1 | 2 | 0 | 1 | Good. |
| 2 | 1.5 | 2.5 | 1 | Do. |
| 3 | 1 | 1 | 1 | Do. |
| 4 | 0.5 | 1.5 | 1 | Do. |
| 5 | 0 | 2 | 1 | Fair. |

(C) In each of a series of experiments, a coating composition was prepared by mixing 40 parts by weight of one of the diesters of maleic acid, phthalic acid, or a mixed diester of maleic and phthalic acids and diethylene glycol prepared in part A above, with 8 parts by weight of diglycidyl ether of dipropylene glycol, 32 parts of Dow Epoxy Novolac Resin D.E.N. 438, and 20 parts by weight of a urea-formaldehyde resin to form a liquid coating composition containing 60 percent by weight of the ingredients in a solvent. Steel test panels were coated on one side with a layer of the composition to form a dry layer one mil thick. The coating was baked in an oven at 300° F. then was removed and allowed to cool to room temperature. The coatings were tested for resistance to methyl ethyl ketone by immersing the test panels in the ketone at room temperature for a period of 18 hours. Table II identifies the experiments and gives the proportions of the maleic anhydride and phthalic anhydride, together with the proportion of diethylene glycol employed in making the diester used in preparing the coating compositions. The table also gives the observed resistance of the baked coating to methyl ethyl ketone.

Table II

| Run No. | Diester ingredient | | | Composition—Resistance of baked coating to methyl ethyl ketone |
|---|---|---|---|---|
| | Maleic anhydride, moles | Phthalic anhydride, moles | Diethylene glycol, moles | |
| 1 | 2 | 0 | 1 | Good. |
| 2 | 1.5 | 0.5 | 1 | Do. |
| 3 | 1 | 1 | 1 | Do. |
| 4 | 0.5 | 1.5 | 1 | Do. |
| 5 | 0 | 2 | 1 | Poor. |

For purpose of comparison, compositions made employing a diester of two molar proportions of phthalic anhydride and one molar proportion of diethylene glycol, and outside the scope of the invention, were made and tested in parts B and C above, and the results included in the Tables I and II.

EXAMPLE 4

In each of a series of experiments, a composition was prepared by mixing (1) a 75 weight percent solution of Dow Epoxy Novolac Resin D.E.N. 438 in Cellosolve acetate, (2) an 80 weight percent solution of a mixed diester, prepared by reaction of one gram molecular proportion of diethylene glycol with a mixture of one gram molecular proportion of maleic anhydride and one gram molecular proportion of phthalic anhydride, in a mixture of equal parts by weight of xylene and methyl ethyl ketone, and (3) a 60 weight percent solution of a urea-formaldehyde resin in a mixture of xylene and butyl alcohol, in amounts of said novolac resin, diester and urea-formaldehyde resin as stated in the following table. The coating compositions were thinned with solvents to a final concentration of 60 percent by weight of said ingredients. Test panels of bonderite phosphatized No. 26 gauge steel having the dimensions of 4 x 12 inches were coated on one side with a layer of the composition and were than baked in an oven at 300° F. to form a final coating one mil thick. The coatings were tested for hardness, flexibility and impact strength. The procedure for testing the coatings for hardness was the lead pencil test. Flexibility of the coating was determined by bending a test panel 180 degrees around a 0.25 inch diameter round mandrel. Impact strength was determined by procedure similar to the Gardnier Laboratories Impact Tester, Item 1660. Other portions of the castings were tested for the effects of glacial acetic acid, methyl ethyl ketone, 10 percent aqueous sodium hydroxide and salt spray (a solution of 5 weight percent sodium chloride in water). Table III identifies the experiments and gives the proportions in parts by weight of the D.E.N. 438, the diester of diethylene glycol and the mixture of maleic and phthalic anhydrides and the urea-formaldehyde resin, employed in the coating composition. The table also gives the results obtained in the tests carried out on the baked coatings.

ganic solvent to form a solution containing from 50 to 80 percent by weight of the ingredients.

2. A coating composition according to claim 1, wherein the amino resin is a urea-formaldehyde resin.

3. A coating composition according to claim 1, wherein the amino resin is a melamine-formaldehyde resin.

4. A coating composition comprising an insoluble infusible intercondensed product obtained by heating a mixture of essential ingredients consisting of (A) from 28 to 51 percent by weight of an epoxy novolac resin having the general formula:

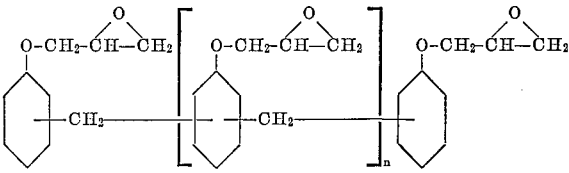

wherein $n$ is an average number from 1 to 1.5, (B) from 22 to 53 percent by weight of an acid ester resulting from the reaction of one gram molecular proportion of diethylene glycol with two gram molecular proportions of an anhydride of a dicarboxylic acid selected from the group consisting of maleic anhydride and mixtures of at least 20 mole percent of maleic anhydride and not more than 80 mole per cent of phthalic anhydride, and (C) from 15 to 44 percent by weight of an amino resin selected from the group consisting of urea-formaldehyde resins, melamine-formaldehyde resins and alkylated urea-formaldehyde and melamine-formaldehyde resins wherein the alkyl radical contains from 1 to 8 carbon atoms.

*Table III*

| | Ingredients of Coating | | | Coating | | | | | | |
|---|---|---|---|---|---|---|---|---|---|---|
| | | | | Properties | | | Resistance to Liquids | | | |
| Run No. | D.E.N. 438, Parts | Diester, Parts | Urea-formaldehyde Resin, Parts | Impact Strength, in.-lbs. | Flexibility | Hardness | Acetic acid | Methyl Ethyl Ketone | 10% NaOH Sol'n | 5% NaCl Sol'n |
| 1 | 47 | 30 | 23 | 26 | Cracked | 4H | Eroded | No effect | No effect | Embrittles. |
| 2 | 40 | 40 | 20 | 30 | do | 8H | No change | do | do | Do. |
| 3 | 35 | 35 | 30 | 30 | do | 8H | do | do | do | Do. |
| 4 | 30 | 40 | 40 | 30 | do | 6H | do | do | do | Do. |
| 5 | 33 | 50 | 17 | 30 | No cracking | 8H | Slight attack | do | do | Some embrittlement. |

We claim:

1. A coating composition comprising a liquid solution of essential ingredients consisting of (A) from 28 to 51 percent by weight of an epoxy novolac resin having the general formula:

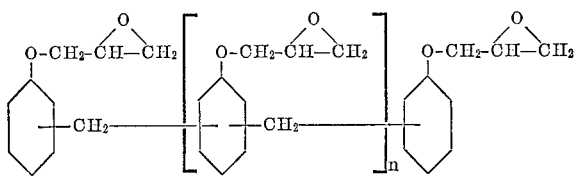

wherein $n$ in an average number from 1 to 1.5, (B) from 22 to 53 percent by weight of an acid ester resulting from the reaction of one gram molecular proportion of diethylene glycol with two gram molecular proportions of an anhydride of a dicarboxylic acid selected from the group consisting of maleic anhydride and mixtures of at least 20 mole percent of maleic anhydride and not more than 80 percent of phthalic anhydride, and (C) from 15 to 44 percent by weight of an amino resin selected from the group consisting of ureaformaldehyde resins, melamine formaldehyde resins and alkylated urea-formaldehyde and melamine-formaldehyde resins, wherein the alkyl radical contains from 1 to 8 carbon atoms, said ingredients (A), (B) and (C) being dissolved in an or- 5. A coating composition according to claim 4, wherein the amino resin is a urea-formaldehyde resin.

6. A coating composition according to claim 4, wherein the amino resin is a melamine-formaldehyde resin.

7. A process which comprises forming a liquid mixture of essential ingredients consisting of (A) from 28 to 51 percent by weight of an epoxy novolac resin having the general formula:

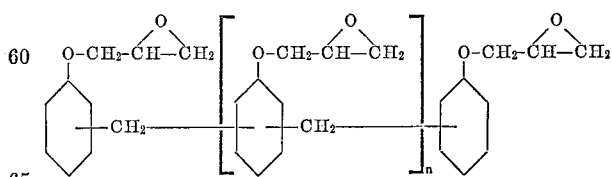

wherein $n$ is an average number from 1 to 1.5, (B) from 22 to 53 percent by weight of an acid ester resulting from the reaction of one gram molecular proportion of diethylene glycol with two gram molecular proportions of an anhydride of a dicarboxylic acid selected from the group consisting of maleic anhydride and mixtures of at least 20 mole percent of maleic anhydride and not more than 80 mole percent of phthalic anhydride, and (C) from 15 to 44 percent by weight of an amino resin selected from the group consisting of urea-formaldehyde resins, melamine-formaldehyde resins and alkylated urea-formaldehyde and melamine formaldehyde resins wherein the alkyl radical contains from 1 to 8 carbon atoms, and heating the aforesaid mixture for a time and at a temperature sufficient to effect intercondensation between the ingredients.

8. A process according to claim 7, wherein the amino resin is a urea-formaldehyde resin.

9. A process according to claim 7, wherein the amino resin is a melamine formaldehyde resin.

References Cited in the file of this patent
UNITED STATES PATENTS

| | | |
|---|---|---|
| 2,337,874 | D'Alelio | Dec. 28, 1943 |
| 2,516,012 | Minter et al. | July 18, 1950 |
| 2,826,562 | Shokal | Mar. 11, 1958 |